(12) United States Patent
Berroth et al.

(10) Patent No.: US 9,139,366 B2
(45) Date of Patent: Sep. 22, 2015

(54) WEAR PROTECTION DEVICE

(75) Inventors: Karl Berroth, Frankenblick (DE); Thomas Vorsatz, Suhl (DE)

(73) Assignee: FCT Ingenieurkeramik GmbH, Rauenstein (DE)

( * ) Notice: Subject to any disclaimer, the term of this patent is extended or adjusted under 35 U.S.C. 154(b) by 0 days.

(21) Appl. No.: 14/123,414

(22) PCT Filed: May 29, 2012

(86) PCT No.: PCT/DE2012/000555
§ 371 (c)(1),
(2), (4) Date: Dec. 2, 2013

(87) PCT Pub. No.: WO2012/163328
PCT Pub. Date: Dec. 6, 2012

(65) Prior Publication Data
US 2014/0097062 A1    Apr. 10, 2014

(30) Foreign Application Priority Data

Jun. 1, 2011    (DE) ..................... 20 2011 101 639 U (51) Int. Cl.
*B65G 11/16*    (2006.01)
*B65G 19/28*    (2006.01)

(52) U.S. Cl.
CPC .............. *B65G 11/16* (2013.01); *B65G 11/166* (2013.01); *B65G 19/285* (2013.01); *B65G 2207/48* (2013.01)

(58) Field of Classification Search
CPC .... B65G 11/16; B65G 11/163; B65G 11/166; B65G 19/285

USPC ....... 198/735.3, 735.5, 860.3, 956; 193/25 E, 193/25 R, 33
See application file for complete search history.

(56) References Cited

U.S. PATENT DOCUMENTS

| 3,607,606 | A | | 9/1971 | Beninga |
| 3,867,239 | A | * | 2/1975 | Alesi et al. ...................... 428/48 |
| 4,241,457 | A | * | 12/1980 | Klein et al. ........................ 2/2.5 |
| 4,855,174 | A | | 8/1989 | Kawamoto |
| 6,189,280 | B1 | | 2/2001 | Malmberg |
| 6,279,715 | B1 | * | 8/2001 | Herren ............................ 193/33 |
| 7,232,023 | B2 | * | 6/2007 | Ellis et al. ..................... 193/2 R |
| 7,837,020 | B2 | * | 11/2010 | Pittman ......................... 193/2 R |
| 8,136,649 | B2 | | 3/2012 | Burström |

FOREIGN PATENT DOCUMENTS

| DE | 294913 A5 | 10/1991 |
| DE | 4344600 A1 | 3/1995 |

(Continued)

*Primary Examiner* — Mark A Deuble
(74) *Attorney, Agent, or Firm* — Laurence A. Greenberg; Werner H. Stemer; Ralph E. Locher (57) ABSTRACT

A wear protection device including a plurality of shaped elements. The shaped elements are substantially plate-shaped in formation. The shaped elements are formed in an integral manner and have at least two planes which are disposed in an offset manner with respect to one another. At least two of the shaped elements are fixed in a shaped element composite in a positional relationship with respect to one another with a first plane of a first shaped element overlaps in sections a second plane of a second shaped element. In the shaped element composite a first shaped element can overlap in sections up to three further shaped elements in a second planes thereof.

16 Claims, 5 Drawing Sheets

(56) References Cited

FOREIGN PATENT DOCUMENTS

| DE | 9320943 | U1 | 6/1995 |
| DE | 19859733 | A1 | 6/2000 |
| DE | 69822000 | T2 | 7/2004 |
| DE | 102009016951 | A1 | 11/2010 |
| EP | 0239660 | A1 | 10/1987 |
| GB | 219422 | A | 7/1924 |
| GB | 2128172 | A | 4/1984 |
| WO | 2006132582 | A1 | 12/2006 |

\* cited by examiner

WEAR PROTECTION DEVICE

BACKGROUND OF THE INVENTION

Field of the Invention

The invention relates to a wear protection means for use on surfaces which are subjected to increased loading.

In principle, wear protection apparatuses, in particular based upon ceramic elements or materials, are known from the prior art.

Wear protection apparatuses of this type are used preferably in applications, in which components are to be protected against damage or wear during the transportation of highly abrasive substances or substance mixtures. For instance, impact walls or pipes of conveying devices as well as sliding surfaces for bulk material can be provided with a wear protection apparatus which is disposed accordingly thereon.

The selection of the suitable wear protection apparatus is governed not only by the type of loading but also by the type, shape or formation of the component to be protected, or base surface.

In the case of planar components or surfaces, large-area wear plates are preferably used which are placed on the planar base surface.

In this case, efforts are devoted mostly toward preventing as much as possible the formation of joints between individual plates and thus the introduction of weak points into the wear protection means.

Furthermore, in order to attach the wear protection apparatuses, in general suitable attachment means are required which depending on the type of attachment are also subjected to wear.

In order to avoid the aforementioned introduction of weak points into the wear protection apparatus, apparatuses including various solutions are known from the prior art.

For example, document DD 294 913 A5 describes a wear protection means which is characterized as a sliding and wear insert for conveying devices.

The wear protection means described has a plurality of elements arranged in succession and consisting of sheet metal, ceramic or glass, whose opposite-lying lateral surfaces are formed in an inclined manner with respect to the upper or lower side of the elements and have a trapezoidal cross-section.

Furthermore, some of the elements have threaded pins, by means of which the elements can be attached to the base body to be protected.

The elements which do not have any threaded pins are secured in dovetailed fashion between in each case two elements which have a threaded pin.

The inventive formation and arrangement of the wear protection elements are intended to ensure that, on the one hand, the required assembly outlay is reduced and that, on the other hand, the otherwise typical, continuous joints between the elements are not created.

A further wear protection means for walls which are subjected to increased wear is disclosed in document DE 698 22 00 T2.

The wear protection means described herein is provided in the form of a wear lining which consists of a number of wear lining elements arranged next to one another.

The wear lining elements optionally have a wear-resistant material, e.g. ceramic.

The wear lining elements are also connected to one another by means of V-shaped disks and have, on two opposite-lying sides, flanges which enable the elements to lock one another in place.

However, the disclosed solution has the disadvantage that in this case on the two other opposite-lying sides on which the V-shaped disks are received, the individual wear lining elements do not have any flanges but instead abut merely in a blunt manner against these points and thus introduce continuous joints. Weak points are thus formed, which is disadvantageous.

Wear protection apparatuses which are used for planar base surfaces generally have the further disadvantage that they are provided substantially as a rigid element composite and are thus not suitable for use on three-dimensionally formed, uneven or flexible components or base surfaces.

In order to provide a wear protection means for these purposes, so-called mosaic mats are preferably used which consist of a large number of individual elements which are arranged preferably on a mat consisting of an elastic material.

This type of wear protection mat is disclosed e.g. in document DE 43 44 600 A1.

In this case, a plurality of quadratic, in particular ceramic, plates are arranged on a mat. Furthermore, provided between the mat and the quadratic plates is a layer of rubber or an elastic material which can be used to absorb impact loads.

In accordance with the invention, the quadratic plates are arranged in such a manner that the plates are positioned so as to be offset with respect to one another in each case by half of one edge length.

This ensures that continuous gaps form only in one direction of the mat which during use of the mat is directed preferably transversely with respect to the movement direction of the substance to be transported.

The prior art also discloses wear protection apparatuses for insertion into so-called feed hoses.

For example, DE 10 2009 016 951 A1 discloses a feed hose for the transportation of abrasive media.

The feed hose has inter alia an inner layer consisting of individual ceramic wear protection rings which are vulcanised together with a rubber layer.

The disadvantage common to the wear protection apparatuses which are known from the prior art and can be used on three-dimensionally formed or flexible base surfaces or components is that they generally have in each case only one single layer and thus have butt joints extending through to the base surface. Impact loads which act upon an element cannot be transmitted effectively to other elements.

BRIEF SUMMARY OF THE INVENTION

Therefore, it is the object of the invention to provide a wear protection means which is simple to produce, can be used universally, has a high level of wear-resistance and increased shock resistance and can be used on curved and deformable base surfaces.

The object is achieved by the features stated as claimed. Preferred developments are found in the disclosure.

A wear protection means in accordance with the invention has a plurality of shaped elements, wherein the shaped elements are substantially plate-shaped in formation.

In a particularly advantageous manner, the shaped elements have at least two planes which are arranged in an offset manner with respect to one another, wherein the planes are materially connected to one another by means of an integral formation of the shaped elements.

In this context, the phrase "offset arrangement of the planes of a shaped element" is understood to mean that the planes are arranged so as to be both horizontally and vertically offset with respect to one another.

At least two of the shaped elements provided in accordance with the invention are fixed in a shaped element composite in a positional relationship with respect to one another such that a first plane of the first shaped element overlaps in sections a second plane of the second shaped element. In a shaped element composite in accordance with the invention, a first shaped element can overlap in sections up to three further shaped elements in the second plane thereof. The same applies to any possible further planes.

The region, in which the respective planes of the shaped elements arranged in a positional relationship with respect to one another overlap one another is also defined hereinafter as the overlapping region.

A region which forms between the overlapping planes of the shaped elements arranged in a positional relationship with respect to one another is also defined hereinafter as a joint or joint region.

As a particular advantage of the invention, the overlaps of the planes of the shaped elements provide a solution, in which inside this type of shaped element composite practically two whole surfaces are formed which lie one above the other and are mutually offset and which advantageously allow a shaped element composite in accordance with the invention to be provided completely without any linear penetrations.

Penetrations are understood to be openings inside a wear protection means, through which an abrasive material or mixture can pass through the wear protection means unhindered to a surface which is to be protected.

As a consequence, an abrasive material is likewise effectively prevented from being able to undermine the wear protection means and thus detach it from the surface to be protected.

As a particular advantage, the material connection of the at least two planes in each shaped element ensures that the positional relationship of the at least two formed, mutually offset whole surfaces is fixed in a reliable manner with respect to one another, so that when transverse and/or shear stresses occur the whole planes cannot be displaced with respect to one another and linear penetrations are guaranteed never to occur. Such transverse and/or shear stresses can thus be absorbed without additional measures and thus in a more effective manner than is the case with the known wear protection apparatuses.

In contrast to the large-area wear protection plates which are known from the prior art, the geometric formation of the shaped elements and the small segmentation of the shaped element composite, as provided in accordance with the invention, ensure in a particularly advantageous manner that in the event of any occurring peak loads as a result of larger parts to be conveyed, e.g. large pieces of rock, the shaped element composite is less susceptible to being irreparably damaged.

In such a case, the occurring impact loads are absorbed and effectively reduced not only by means of an individual large wear element, as is otherwise typical, but also by means of the large number of shaped elements. In small segmentation, the formation of cracks is to be prevented more effectively.

A wear protection means is understood to be a protector to prevent wear caused in particular by means of abrasive, mechanical and thermal loads.

In a particularly advantageous development of the wear protection means, it is provided that the positional relationship of the shaped elements with respect to one another is fixed by virtue of a connecting means.

A connecting means is understood in this case to be any way of establishing a positional relationship of the shaped elements with respect to one another.

In a further preferred variation of the invention, at least two shaped elements are connected directly to one another.

A direct connection is understood to mean that a connection of shaped elements arranged in a positional relationship with respect to one another is established in the overlapping and/or joint region, or in sections thereof.

In an advantageous manner, the first plane of the first shaped element is connected in a firmly bonded manner to the second plane of the second shaped element in the overlapping region. Alternatively or cumulatively, the firmly bonded connection can also be effected in the joint region.

As a significant advantage, the direct connection of the shaped elements to one another ensures a uniform distribution of the forces, which act upon one shaped element or a small number of shaped elements of the shaped element composite, inside a wear protection means in accordance with the invention.

In particular, impact loads which occur at certain points can thus be more effectively absorbed and dissipated by the shaped element composite than is the case with conventional wear protection apparatuses.

In a further preferred development of the invention, a direct connection of at least two shaped elements to one another is achieved in the overlap and/or joint region by means of an applied binder or adhesion promoter.

Depending upon the application, the binder or adhesion promoter can be applied either to the entire surface or else also only to sections of the overlapping region and/or the joint region of two shaped elements arranged in a positional relationship with respect to one another.

For this purpose, a binder or adhesion promoter is used which is selected according to the requirement profile and which is able to withstand the mechanical and thermal loads during use of a wear protection means in accordance with the invention.

In order to facilitate, in particular, adaptability of the wear protection means to suit uneven base surfaces, the binder or adhesion promoter used preferably has corresponding elasticity properties.

In a further particularly advantageous variation of the invention, the shaped elements are connected to one another by vulcanisation of an elastomer material in the overlap and/or joint region.

The vulcanisation of the elastomer material between the shaped elements permits, in dependence upon its elasticity properties, further increased flexibility of the shaped element composite, whereby the latter can also be used on extremely uneven and/or very flexible base surfaces.

At the same time, the elasticity and thus resilience of the elastomer material vulcanised between the shaped elements enable the wear protection means in a particularly advantageous manner to absorb impact loads, which occur at certain points, and to reduce these loads by reason of the elastic resilience.

In a likewise preferred development of the wear protection means, it is provided that the shaped elements are connected to one another indirectly by virtue of the connecting means.

In the present case, an indirect connection is understood to mean that the respective shaped elements are not connected to one another but rather that each of the shaped elements in its own right is connected to a support plane arranged on the underside, so that the positional relationship of the shaped elements with respect to one another is fixed indirectly by means of the support plane.

The support plane is provided by means of a suitable support material. The base surface which is to be protected can itself also form the support plane.

The indirect connection of the shaped elements to one another by means of the rear-side support plane permits the formation of defined spaced intervals between the respectively mutually connected planes of the shaped elements.

In dependence upon the selection of the spaced interval dimensions between the shaped elements, the shaped elements are permitted in a particularly advantageous manner to perform a restricted relative movement with respect to one another and thus to ensure flexibility of the inventive wear protection means which is adapted to the respective designated use, without continuous penetrations forming between the shaped elements, into which abrasive material could penetrate. In this case, the support plane is designed to be elastic and preferably at the same time high-tensile and shear-resistant.

Within a wear protection means in accordance with the invention, the high-tensile and shear-resistant support plane assumes the function of a reinforcement for the shaped element composite and prevents individual shaped elements from passing through the support plane e.g. in the event of local impact loads.

In a particularly advantageous manner, the support plane can also have yielding and damping properties. Particularly in the event of locally occurring impact loads, e.g. on account of large pieces of rock impacting upon the wear protection means, the impact can be absorbed in such a case by the resilience of the support layer and can be reduced in an effective manner by damping.

In order to be able to achieve this, the support layer can also be allocated damping elements, such as gel or air cushions which are placed e.g. between the surface to be protected and the support layer or are integrated into the support layer.

Furthermore, the support plane can be formed in an advantageous manner by means of flexible steel elements, e.g. steel wires, onto which the shaped elements are threaded.

However, depending upon requirement the support plane can similarly also be formed to be rigid and/or inflexible.

In a particularly advantageous variation of the invention, the shaped elements are connected to one another by being embedded into a support material.

The support material consists preferably of an elastomer material and is likewise selected so as to withstand the occurring mechanical and thermal loads during use of a wear protection means in accordance with the invention.

The shaped elements are embedded preferably by vulcanising the support material around the shaped elements, wherein the inventive overlapping of the individual shaped elements is always retained.

In accordance with the invention, it is likewise possible to connect the shaped elements to the support material in a mechanical manner, e.g. by screwing.

A wear protection means in accordance with the present invention can be curved in an extremely advantageous manner, depending on the selection of the connecting means, in different spatial directions and can thus be used on the most varied base surfaces to be protected.

Impact loads which occur at certain points are absorbed and reduced, on the one hand, by virtue of the resistance capability of the shaped elements themselves and, on the other hand, by virtue of the elastic resilience of the entire shaped element composite.

The direct and indirect connection of the shaped elements to one another also render it possible in a particularly advantageous manner that a wear protection means in terms of the present invention can be preassembled according to the respective designated use and, at its site of use, merely has to be placed onto, or attached to, the base surface which is to be protected.

Complex and time-intensive installation work on site are thus effectively avoided.

The direct and indirect connection also render it possible in an advantageous manner to form a continuously long and/or continuously broad, rigid or flexible composite consisting of shaped elements, for use as a wear protection means.

In a further preferred embodiment of the wear protection means, it is provided that the support plane provided in accordance with the invention is formed by means of a base surface itself which is to be protected. In particular, this offers particular advantages when the individual shaped elements are applied non-positively and/or positively to the base surface to be protected or to the component to be protected.

In a further advantageous development, individual or else also all of the shaped elements of the wear protection means are thus provided with anchors which engage into openings in the base surface which are provided for this purpose.

Anchors are understood to be any convex deviation from the planar surface of the side of the shaped elements which faces towards a surface to be protected and facilitates connection of the shaped element to the support plane.

The connection between the shaped element and the base surface can be designed to be rigid or movable depending upon the application.

In a likewise preferred variation of the invention, it is provided that individual or all of the shaped elements of the wear protection means have cut-outs, into which attachment means, such as e.g. anchors or screws, engage.

In this case, the shaped element can be also be connected either movably or rigidly to the base surface or another support plane.

In a further preferred embodiment of the wear protection means, the shaped elements consist of ceramic material.

This includes all known ceramic or ceramic composite materials, as well as ceramic fibre composite materials.

The shaped elements are produced in a known manner by sintering the used ceramic material and have a high level of abrasion resistance and wear resistance, highly effective corrosion resistance, as well as heat resistance. The heat resistance, the low coefficient of thermal conductivity and the low coefficient of thermal expansion make it possible as a particular advantage to render the wear protection means usable also as a thermal wear protection means.

Furthermore, inventive shaped elements consisting of ceramic material have comparatively low surface masses.

Furthermore, it is also feasible to form the shaped elements provided in accordance with the invention with a ceramic laminate, by means of which the resistance capability of the shaped elements can be improved once again.

In a likewise advantageous development, the shaped elements of the wear protection means which are provided in accordance with the invention are manufactured from hard metal material, in particular sintered hard metal.

Hard-metallic materials likewise have a high degree of hardness and abrasion resistance, as well as highly effective heat resistance.

Beyond the illustrated embodiments, the shaped elements of the disclosed wear protection means can likewise be manufactured by any other materials, as long as these materials have the required level of wear and heat resistance.

In a further preferred embodiment of the invention, it is provided by way of continuation that the shaped elements are arranged inside an inventive shaped element composite essentially in such a manner that the mutually connected planes of the shaped elements have height levels which descend in the direction of flow of the abrasive medium. Therefore, as seen in the direction of flow, the planes are provided in a scale-like arrangement.

As a result, when the abrasive medium moves over a wear protection means in accordance with the invention it is a particular advantage that the abrasive medium is prevented from being able to pass underneath the shaped elements and thus damage the wear protection means.

In a further preferred development of the wear protection means, the shaped elements are arranged in the formed shaped element composite in such a manner as to be offset like brickwork in the longitudinal direction thereof.

As a particular advantage, this kind of offset arrangement of the shaped elements ensures that each shaped element is already connected in a positive manner in the longitudinal direction of the shaped element composite in its first plane to at least two further shaped elements. In a particularly convenient manner, penetration by a medium being guided is thus made more difficult, the distribution of load peaks to a plurality of shaped elements is promoted and the resistance capability is thus improved.

In a preferred development, the planes of the shaped elements are symmetrical, i.e., they are formed with the same thickness and same projection. Therefore, the entire shaped element has a repeatedly symmetrical structure, thus resulting in advantages in terms of production because less complex handling technology is required for supplying the shaped elements in a positionally correct manner for assembly.

In one particular embodiment of the invention, it is provided that the shaped elements each have three planes arranged in an offset manner with respect to one another.

In accordance with the invention, the offset of the planes is selected such that the plane facing towards the medium and the plane facing towards the base surface to be protected do not overlap.

The formation of shaped elements with three planes has the particular advantage that penetrations, either linear or point-shaped, do not occur in the shaped element composite. This excludes in a particularly reliable manner the possibility of an abrasive medium passing directly through the shaped element composite.

The invention will be explained in greater detail as an exemplified embodiment with reference to the drawing, in which.

BRIEF DESCRIPTION OF THE SEVERAL VIEWS OF THE DRAWING

DESCRIPTION OF THE INVENTION

An exemplified embodiment of a wear protection means in accordance with the invention has a large number of shaped elements 1.

Figure 1A:
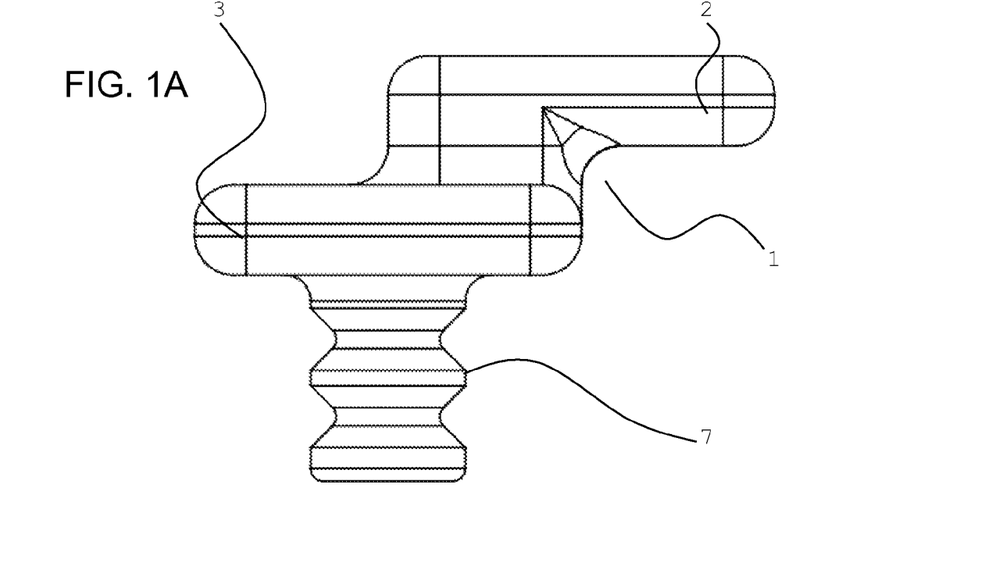
FIG. 1a shows a lateral view of a shaped element with two planes.
Figure 1B:
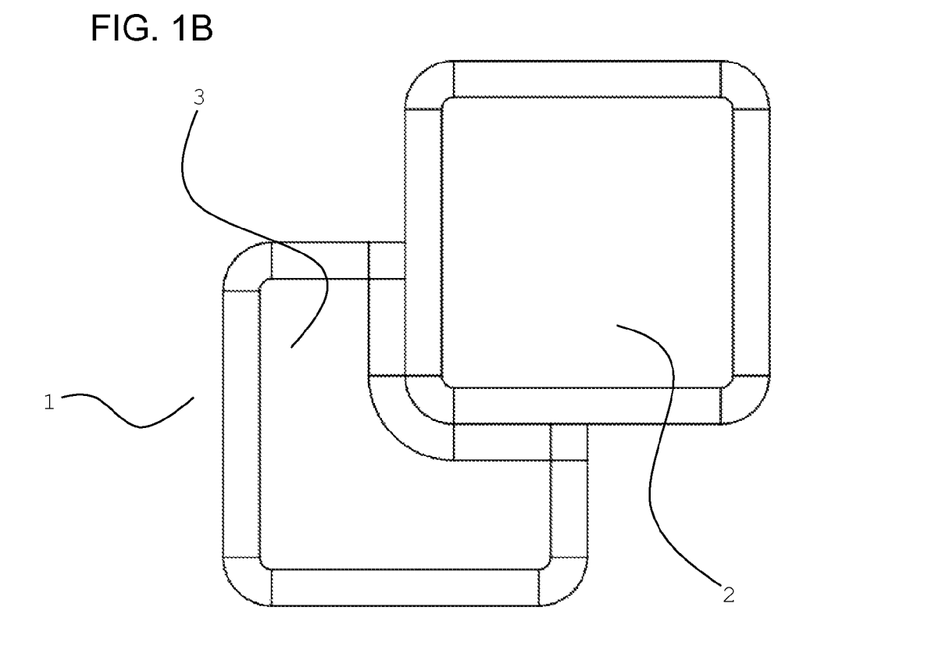
FIG. 1b shows a plan view of a shaped element with two planes.

FIGS. 1a and 1b show this type of shaped element 1 in a detailed illustration.

In accordance with the invention, the shaped elements 1 are formed in such a manner that they each have a first plane 2 and a second plane 3.

The planes 2 and 3 are arranged inside the respective shaped element 1 so as to be horizontally and vertically offset with respect to one another and are fixed in position with respect to one another by means of the material connection.

In summary, the shape of a shaped element 1 can also be described in such a way that two plates of equal size are provided in a plane-parallel manner and displaced over the diagonal thereof, wherein both plates merge materially with one another in their connecting region.

Furthermore, the second plane 3 is allocated an anchor 7 which serves to anchor the shaped element 1 in a support plane.

Figure 2A:
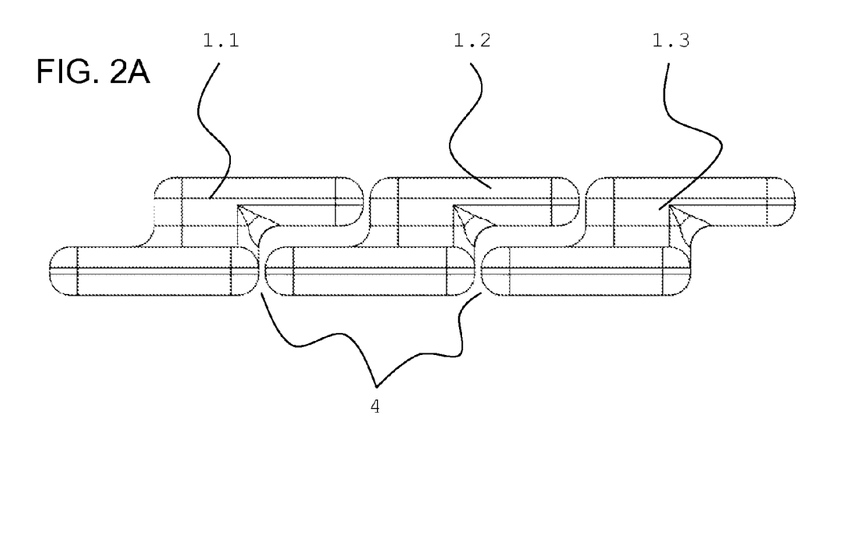
FIG. 2a shows a lateral view of a shaped element composite.
Figure 2B:
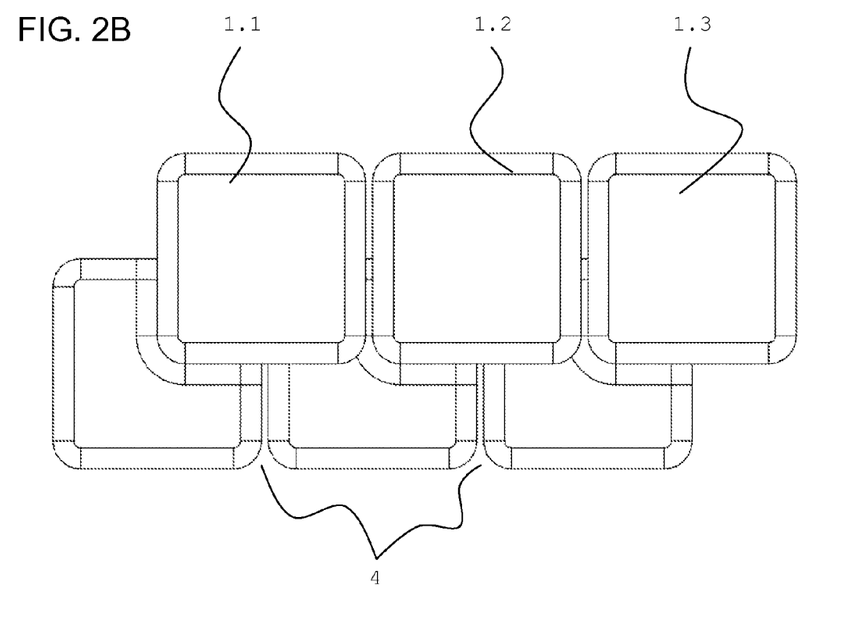
FIG. 2b shows a plan view of a shaped element composite.

FIGS. 2a and 2b illustrate a shaped element composite in accordance with the invention, consisting of at least three shaped elements 1.1, 1.2 and 1.3 which are arranged in a positional relationship with one another.

For the sake of clarity, a connecting means, used for establishing the positional relationship of the shaped elements 1 with respect to one another, is not illustrated in this case.

In accordance with the invention, joints 4 are formed between the shaped elements 1.1 and 1.2 and 1.2 and 1.3 and in the further course thereof can be filled completely or even only partially with an elastomer material.

The formation of the joints 4 between the respective shaped elements 1 gives rise in a particularly advantageous manner to a flexibility of the shaped element composite, whereby the latter can also be adapted to suit very uneven or flexible objects.

Figure 3:
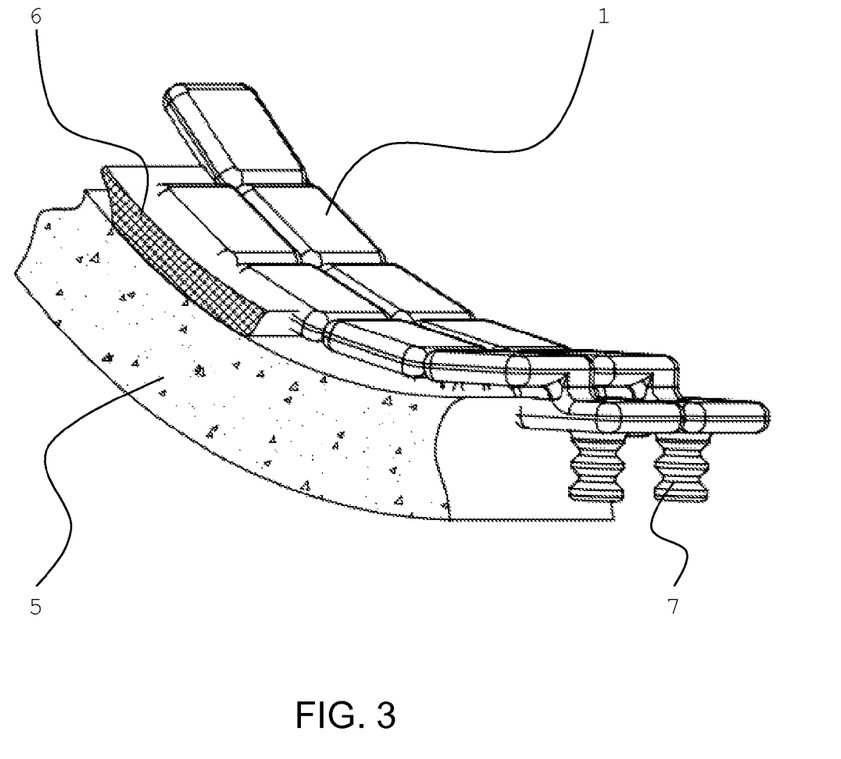
FIG. 3 shows a perspective and sectional view of the shaped element composite with a support plane.

FIG. 3 illustrates a section of a complete wear protection means in accordance with the invention.

In this case, a plurality of shaped elements 1 are connected to a support plane 5 by means of their anchor 7.

The connection between the shaped elements 1 and the support plane is achieved e.g. by mechanical insertion of the shaped elements 1 or by vulcanisation.

In a particularly advantageous manner, the support plane 5 consists of an elastic and high-tensile and shear-resistant material which inside the wear protection means assumes a reinforcing function for the shaped element composite.

At the same time, the elasticity of the support plane 5 ensures the flexible adaptability of the wear protection means to suit uneven base surfaces, and the ability to use the wear protection means on flexible objects.

In the present case, the joint region which forms between the shaped elements 1 is filled with an elastomer material 6, wherein the elastomer material 6 is vulcanised into the joint region.

In a particularly advantageous manner, the elastomer material 6 produces a direct, firmly bonded interconnection of the shaped elements which provides the wear protection means with a further increased resistance capability with respect to impact loads and abrasive effects.

Figure 4:
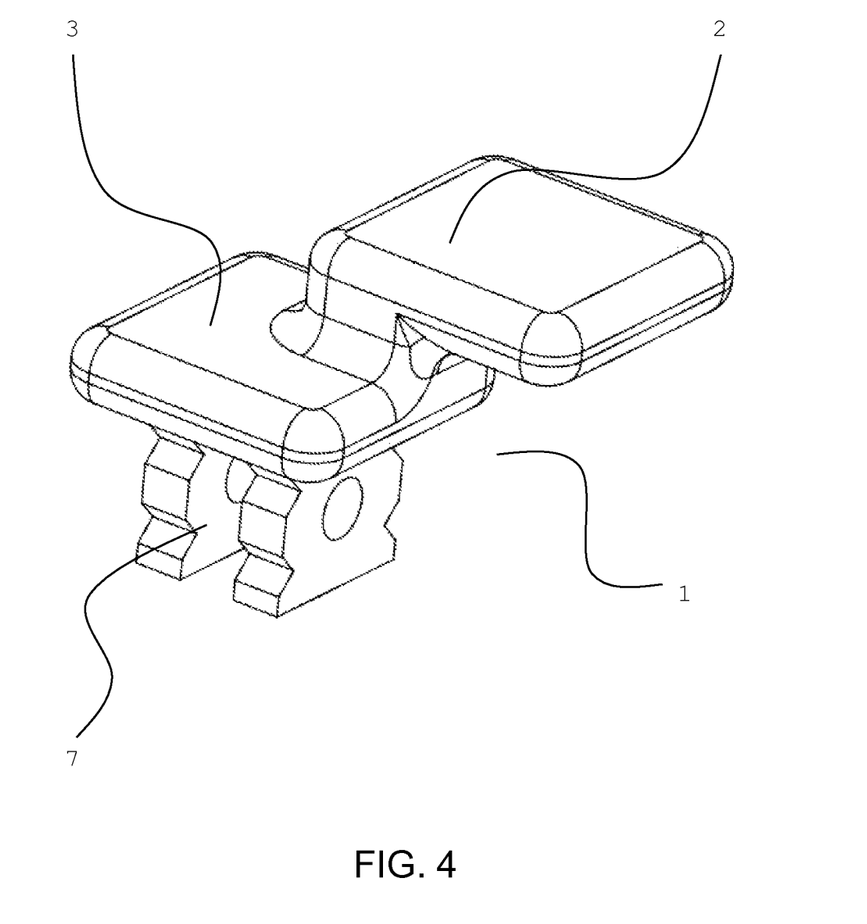
FIG. 4 shows a perspective view of the shaped element with a double anchor.

FIG. 4 illustrates a particular embodiment of a shaped element 1.

This embodiment is a shaped element 1 having a dual and perforated anchor 7.

An anchor 7 which is formed in this manner renders it possible in a particularly advantageous manner to connect a shaped element 1 by means of flexible steel elements, in particular by means of steel wires (not illustrated).

In such a case, the support plane 5 would be formed by the flexible steel elements, e.g. as a wire grating.

Complex vulcanisation of a support plane or complex insertion of the shaped elements 1 into a support plane 5 is thus avoided.

Figure 5A:
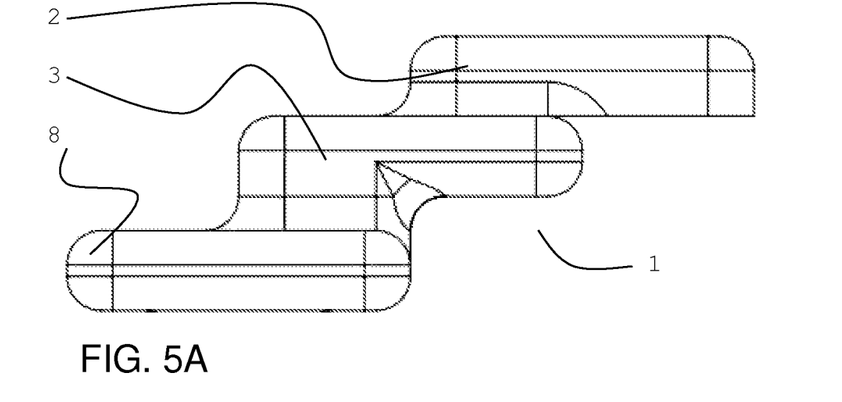
FIG. 5a shows a lateral view of a shaped element with three planes.
Figure 5B:
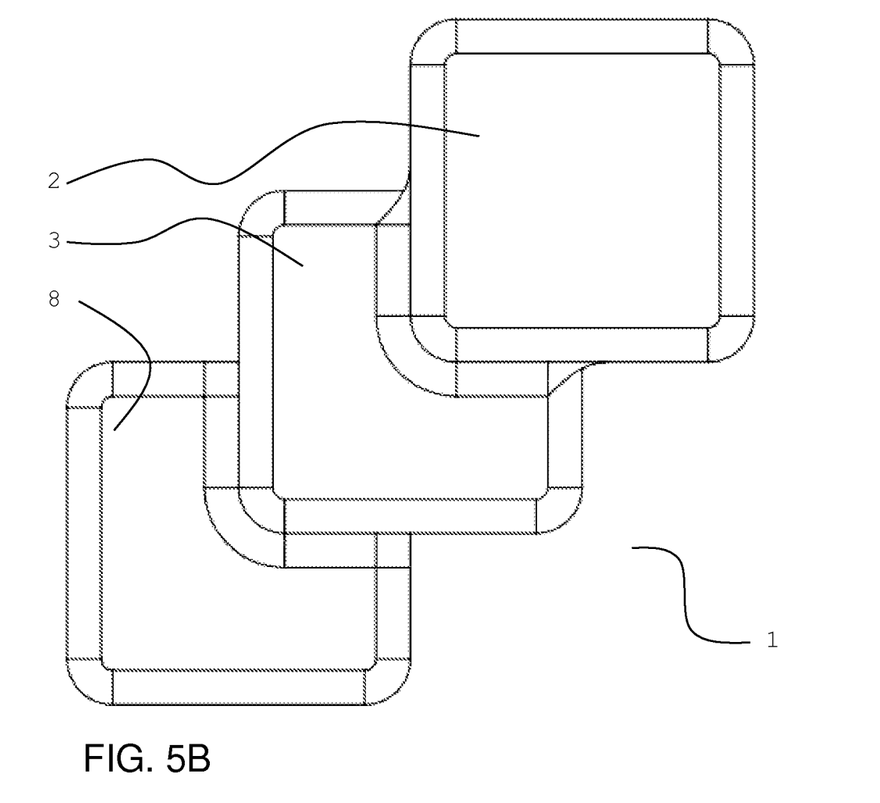
FIG. 5b shows a plan view of a shaped element with three planes.

FIGS. 5a and 5b show a plate shaped element 1 which has three planes 2, 3, and 8 which are disposed offset with respect to one another.

LIST OF REFERENCE NUMERALS 1 shaped element
1.1 first shaped element
1.2 second shaped element
1.3 third shaped element
2 first plane
3 second plane
4 joint
5 support plane
6 elastomer material
7 anchor

The invention claimed is:

1. A wear protection device, comprising:
a plurality of plate-shaped shaped elements each defining at least two planes disposed in an offset manner with respect to one another, said at least two planes of each of said plate shaped elements being connected to one another in a connection region;
at least two of said plate-shaped elements being fixed in a positional relationship with respect to one another for defining a shaped element composite and with a first plane of a first one of said at least two plate-shaped elements overlapping, in an overlapping region, a second plane of a second one of said at least two plate-shaped elements and a second plane of at least another of said plurality of said plate-shaped elements, said connection region being smaller than said overlapping region; and
a complete surface being defined in said shaped element composite by each of said at least two planes of said shaped elements.

2. The wear protection device as claimed in claim 1 further comprising a connection device fixing said positional relationship of said plate-shaped elements relative to one another.

3. The wear protection device as claimed in claim 2 wherein said connecting device directly connects said plate-shaped elements to one another.

4. The wear protection device as claimed in claim 3 wherein a binder or adhesion promoter connects said plate-shaped elements to one another.

5. The wear protection device as claimed in claim 3 wherein said plate-shaped elements are connected to one another by vulcanisation of an elastomer material.

6. The wear protection device as claimed in claim 2 wherein said connecting device indirectly connects said plate-shaped elements via a respective direct connection of said plate-shaped elements to a support plane on an underside of said plate-shaped elements.

7. The wear protection device as claimed in claim 6 wherein said support plane is an elastic support material, to which said plate-shaped elements are connected by being embedded.

8. The wear protection device as claimed in claim 6 wherein said support plane is formed by a base surface which is to be protected.

9. The wear protection device as claimed in claim 6 wherein said plate-shaped elements are provided with anchors which engage into said support plane.

10. The wear protection device as claimed in claim 6 wherein said plate-shaped elements have cut-outs, into which an attachment device engages, said engagement device is in engagement with said support plane.

11. The wear protection device as claimed in claim 1 wherein said plate-shaped elements are formed of ceramic material.

12. The wear protection device as claimed in claim 1 wherein said plate-shaped elements are of formed of hard metal material.

13. The wear protection device as claimed in claim 1 wherein said planes of respective said plate-shaped elements are disposed at descending height levels in a direction of flow of a medium to be guided.

14. The wear protection device as claimed in claim 1 wherein said plate-shaped elements are disposed in said shaped element composite to be offset like brickwork.

15. The wear protection device as claimed in claim 1 wherein said planes of said plate-shaped elements are formed symmetrically.

16. The wear protection device as claimed in claim 1 wherein said plate-shaped elements each have three planes which are disposed to be offset with respect to one another.

* * * * *